United States Patent Office 2,733,256
Patented Jan. 31, 1956

2,733,256
SALTS OF BASIC N-METHYL BENZILAMIDES

John Krapcho, New Brunswick, Edward J. Pribyl, Metuchen, and Jack Bernstein, New Brunswick, N. J., assignors to Olin Mathieson Chemical Corporation, a corporation of Virginia No Drawing. Application April 9, 1953,
Serial No. 347,834

9 Claims. (Cl. 260—459)

This invention relates to salts of basic N-methyl benzilamides and to methods for preparing them.

The compounds of this invention may be represented by the general formula

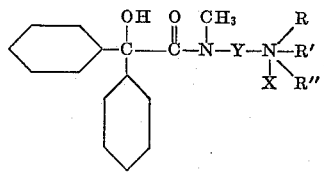

wherein: Y is lower alkylene of at least 2 carbon atoms, preferably ethylene; R and R' are each lower alkyl, preferably of 1 to 3 carbon atoms, or, together with N, form a heterocyclic ring; R'' is hydrogen or, preferably, lower alkyl or aralkyl; X is an anion, preferably chlorine, bromine, iodine, or methosulfate [the terms "lower alkyl" and "lower alkylene" are meant to include branched as well as straight chain groups].

The compounds are highly-stable, unusually-potent antisecretory agents or antispasmodics. Thus, they have been found to exhibit anticholinergic activity near that of atropine and closely paralleling that of Banthine (β-diethylaminoethyl - 9 - xanthenecarboxylate methosulfate). The N-methyl compounds of this invention have been found to be unique in this respect, as evidenced by the results obtained when hydrochlorides and methobromides of a series of compounds of the formula

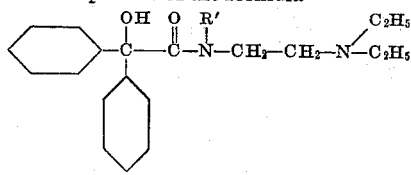

were evaluated on the basis of their ability to relax the isolated rabbit ileum. Following are the tabulated data thus obtained:

| R' | Antispasmodic activity vs. acetylcholine (atropine=1) | |
|---|---|---|
| | Methobromide | Hydrochloride |
| H | 1/22 | 1/31. |
| CH₃ | 1/1.7 | 1/6. |
| C₂H₅ | 1/10.4 | 1/10. |
| CH₂CH₂CH₃ | 1/470 (approx.) | 1/400 (approx.). |
| CH(CH₃)₂ | 1/33.5 | 1/240 (approx.). |

As to the preparation of these compounds, the hydrohalide salts may be obtained by mixing an α-halodiphenyl acetyl halide with a diamine of the formula

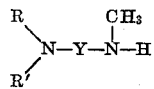

wherein R and R' are each lower alkyl or, together with N, form a heterocyclic ring, and Y is lower alkylene, preferably in the presence of an inert solvent, then heating in the presence of dilute mineral acid or alkali, such as hydrochloric, hydrobromic, sulfuric, or trichloracetic acids, sodium hydroxide or potassium hydroxide (preferred are the acids, especially hydrochloric acid), and separating the hydrohalide of the aminoalkyl benzilamide from the reaction mixture. To prepare salts from such hydrohalides, the latter are first treated with alkali to liberate the free base and the free base is then allowed to react with either (1) an acid to form an acid-addition salt or (2) an ester of an inorganic acid to form a quaternary ammonium salt. The free base may be formed directly by adding a hydrohalide-acceptor, such as sodium carbonate, potassium carbonate, etc., to the reaction medium where a hydrohalide is liberated during the reaction. The base, thus formed, may then be treated as described above to form acid-addition or quaternary ammonium salts. The acid-addition products may be formed with such acids as hydrochloric, hydrobromic, hydriodic, sulfuric, citric, tartaric, etc.; and the quaternary ammonium salts may be formed by treatment of the base with such reagents as methyl chloride, methyl bromide, ethyl bromide, dimethyl sulfate, ethyl nitrate, benzyl chloride, etc. Another possible method of preparation comprises treating the α-halodiphenyl acetyl halide with a methylaminoalkyl halide (or hydroxide), then treating the resulting product with a selected secondary amine to obtain the desired aminoalkyl benzilamide hydrohalide [or free base, if the reactions are carried out in the presence of a hydrohalide-acceptor]. The desired salts may then be prepared as indicated above.

According to this invention, a therapeutically-active quantity of at least 0.1 per cent of a compound of this invention may be associated with a carrier, which is preferably a solid material, but which may also be a sterile liquid vehicle or a liquid pharmaceutical carrier, such as a syrup. Thus, the formulations may take the form of tablets, powder packets, capsules or other dosage-unit forms which are useful for oral administration. These may be prepared in the conventional manner and may contain other active ingredients, such as neutralizers and/or antacids. For example, tablets may be made to contain 5 mg. or more (preferably 10 to 100 mg.) of the agent using conventional excipients, fillers, and disintegrators. As excipients, one may use lactose, carboxymethylcellulose, or hydrated alumina. Starch may be used as a filler and/or disintegrator. The tablets may be scored to enable one to take fractional dosages. Two-piece capsules may be prepared to contain a mixture of the agent and excipient (e. g. starch, talc, stearic acid, magnesium stearate), the agent being present in an amount of the order of about 5 mg. or more. Also, one piece gelatin capsules may be prepared, containing the desired dosage in sufficient corn oil to render the agent capulsatable. Any of the tabletting or encapsulating agents used in pharmaceutical practice may be employed where there is no incompatibility with the particular agent.

Following are typical formulae used in preparing 100 mg. tablets of the agent, 2-(N-methyl benzilamido) ethyl diethyl methylammonium bromide. Formula A was used to prepare 4,000 tablets and formula B to prepare 2,490 tablets.

| | A | B |
|---|---|---|
| Agent, grams | 400 | 249 |
| Hydrated alumina (powder), grams | 300 | |
| Sodium carboxymethylcellulose, grams | | 809 |
| Granulating Paste (10% aqueous starch suspension), grams | 2,000 | 400 |
| Stearic acid, grams | 75 | |
| Magnesium stearate, grams | 5.0 | 2.5 |
| Isopropanol, ml | | 95 |
| Cornstarch, grams | 150 | 110 |
| Water, grams | | 450 |

3

The agent may also be prepared in liquid (solution or suspension) form. Thus, a composition may be prepared to contain about 5 mg. or more of the agent per ml. of liquid pharmaceutical carrier, such as a carbohydrate-containing (e. g. syrup) or an aqueous-alcoholic vehicle.

Following are illustrative examples characteristic of, but not limiting, the scope of the invention:

EXAMPLE 1

2-(N-methyl benzilamido) ethyl diethyl methylammonium bromide (a) N-(2-DIETHYLAMINOETHYL)-N-METHYLBENZIL-AMIDE A solution of 216 g. N,N-diethyl-N'-methyl-ethylenediamine in 200 ml. benzene is added dropwise to a solution of 450 g. α-chlorodiphenylacetyl chloride in 2 liters of a 1:3 benzene-hexane solution. After completion of the addition, the mixture is stirred for one hour at room temperature, then refluxed for one hour and cooled. 700 ml. water are added and the resulting mixture is stirred for about thirty minutes. The aqueous phase is then separated and the organic phase is extracted with a solution of 150 ml. concentrated hydrochloric acid in 800 ml. water (in two portions). The three aqueous extracts are combined, extracted once with about 300 ml. ethyl ether to remove any non-basic material, then heated on a steam bath at 70–80° for thirty minutes to yield an aqueous solution of N-(2-diethylaminoethyl)-N-methyl benzylamide hydrochloride [the hydrochloride may be isolated by evaporation of the solvent]. After cooling, the solution is treated portionwise with about 400 ml. of a 60% aqueous solution of sodium hydroxide. The liberated base is extracted with about two 800 ml. portions of ether. The organic extracts are combined, washed with 500 ml. water and dried over magnesium sulfate. After standing overnight, the dry solution is treated with about a gram of a decolorizing charcoal (e. g. Darco), filtered, and the solvent evaporated to yield N-(2-diethylaminoethyl)-N-methyl benzilamide as a pale red syrupy liquid in about 91% yield.

(b) 2-(N-METHYL BENZILAMIDO) ETHYL DIETHYL METHYLAMMONIUM BROMIDE

A solution of 1442 g. of the base obtained as described in (a) in 4.0 l. acetone is cooled and 1019 g. methyl bromide is added, causing a heavy precipitate to separate from the solution. After the reaction mixture has been allowed to remain at room temperature for fortyeight hours, the precipitate is separated by filtration, then crystallized by dissolving it in 2.5 l. of hot absolute alcohol, adding about a gram of decolorizing charcoal (e. g. Darco), filtering and diluting the filtrate with 5.0 l. of hot isopropyl alcohol. The crystalline 2-(N-methyl benzilamido) ethyl diethyl methyl ammonium bromide (M. P. 186–7° C.) separates from the solution in about 93% yield.

EXAMPLE 2

2-(N-methyl benzilamido) ethyl diethyl methylammonium chloride

To a solution of 656 g. of the base, obtained as described in Example 1 (a), in 2 liters acetonitrile is added 300 g. methyl chloride. After remaining at room temperature for four days, the colorless crystalline precipitate is filtered to yield about 610 g. 2-(N-methyl benzilamido)ethyl diethyl methyl-ammonium chloride, M. P. 191–192° C. (dec.). Concentration of the filtrate to about one-half of its original volume, followed by cooling yields an additional 57 g. of the quaternary salt, M. P. 191–192° C. (dec.). [The product may be purified by recrystallization from isopropyl alcohol.]

EXAMPLE 3

2-(N-methyl benzilamido)ethyl diethyl methylammonium methosulfate

To a solution of 24.4 g. of base, obtained as described in Example 1 (a), in 50 ml. acetone is added 10.1 g. dimethyl sulfate. After remaining at room temperature overnight, the solution is diluted to yield an oil which is triturated with ethyl ether, then dissolved in 25 ml. isopropyl alcohol, and again diluted with ethyl ether. The semi-solid which separated is heated with 200 ml. butanone, cooled, and the resulting solid filtered. On crystallization from a mixture of 70 ml. isopropyl alcohol and 10 ml. ethyl ether, about 26 g. methosulfate [M. P. 85–86° C. (dec.)] is obtained.

EXAMPLE 4

2-(N-methyl benzilamido)ethyl triethylammonium iodide

A mixture of 13.0 g. of base, obtained as described in Example 1(a) and 26.0 g. ethyl iodide is allowed to remain at room temperature for 4 days. A crystalline product slowly separates from solution. The reaction mixture is then diluted with 100 ml. of ethyl ether and filtered. The precipitated 2-(N-methyl benzilamido)ethyl triethylammonium iodide, on recrystallization from methanol, yields about 16.5 g. purified product, M. P. 207° C. (dec.).

EXAMPLE 5

2-(N-methyl benzilamido)ethyl diisopropyl methylammonium bromide (a) N,N-DIISOPROPYLAMINO-N'-METHYLETHYLENE-DIAMINE 117 g. 2-diisopropylaminoethyl chloride hydrochloride and 55 g. anhydrous potassium carbonate are added to a solution of 100 g. monomethylamine in 300 ml. absolute ethanol. The reaction mixture is refluxed for three hours, allowed to remain at room temperature overnight, then diluted with 500 ml. water, treated with additional potassium carbonate in order to render it strongly alkaline and extracted with ethyl ether. The ether extract is dried over anhydrous magnesium sulfate, then the ether is allowed to evaporate and the residue is fractionated to yield about 65 g. of the desired diamine, M. P. 177–183° C.

(b) N-(2-DIISOPROPYLAMINOETHYL)-N-METHYL-BENZILAMIDE HYDROCHLORIDE

A solution of 65 g. N,N-diisopropylamino-N'-methylethylenediamine in 400 ml. dry toluene is added dropwise with ice-cooling to a solution of 109 g. α-chlorodiphenylchloroacetyl chloride in 400 ml. dry toluene. A white solid gradually separates. After the addition, the reaction mixture is stirred at room temperature for one hour, heated on a steam bath for one hour, then allowed to remain at room temperature overnight. The mixture is then extracted with 2% aqueous hydrochloric acid solution. The aqueous extract, after being washed with ethyl ether, is heated for one-half hour at 75° C. The solution is then cooled and rendered alkaline with excess potassium carbonate in order to liberate the free base. This base is then taken up in ether, washed several times with water, and dried over anhydrous magnesium sulfate. The drying agent is separated by filtration and the filtrate acidified to Congo red indicator with ethereal hydrogen chloride. The hydrochloride precipitates as a gum but begins to crystallize after a few minutes. On recrystallization of the precipitate from absolute alcohol there is obtained about 87 g. of purified N-(2-diisopropylaminoethyl)-N-methylbenzilamide hydrochloride, M. P. 230–231° C. (dec.).

(c) 2-(N-METHYLBENZILAMIDO) ETHYL DIISOPROPYL METHYLAMMONIUM BROMIDE

A solution of 59 g. of the base derived by treatment of the hydrochloride obtained as described in part (b) with sodium hydroxide solution is added to 50 ml. acetone and to the resulting solution is added a solution of 30 g. methyl bromide in 100 ml. acetone. This mixture is then heated in a pressure bottle at 50–60° C. for two and one-half hours. The bulk of the acetone is distilled off and the residue is diluted with anhydrous ethyl ether. The solid which precipitates is collected, washed with anhydrous ethyl ether, and desiccator-dried to yield about 9.5 g. 2-(N-methyl benzilamido) ethyl diisopropyl methylammonium bromide. The filtrate is concentrated by allowing some of the solvent to evaporate and the concentrate is again treated with excess methyl bromide in acetone. After heating at 55–65° C. for seven hours, the reaction mixture is treated as above to yield about 10.5 g. additional quaternary ammonium salt. On recrystallization of the combined fractions from a mixture of 400 ml. methyl ethyl ketone and 30 ml. absolute ethanol, there is obtained about 14.7 g. of purified 2-(N-methyl benzilamido) ethyl diisopropyl methylammonium bromide, M. P. 164–165° C. (dec.).

EXAMPLE 6

*2-(N-methyl benzilamido) ethyl trimethylammonium bromide*

(a) N,N,N'-TRIMETHYL ETHYLENEDIAMINE

To 928 g. monomethylamine in 40% aqueous solution is added 432 g. 2-dimethylaminoethyl chloride hydrochloride. The resulting solution is heated on a steam bath for a few minutes, then cooled until the exothermic reaction subsides. Heating is then resumed and allowed to proceed for 4 hours. The reaction mixture is then cooled, and 400 g. sodium hydroxide pellets are added periodically with stirring. The liberated base is extracted with ethyl ether. After drying the ether extract with potassium carbonate, the solvent is evaporated and the residue distilled to yield 161 g. colorless distillate, B. P. 75–125° C. The distillate, after further drying over potassium carbonate, is redistilled to yield about 85 g. purified N,N,N'-trimethyl ethylenediamine, B. P. 102–109° C.

(b) N-(2-DIMETHYLAMINOETHYL)-N-METHYLBENZILAMIDE

A solution of 34.0 g. amine obtained as described in (a) in 100 ml. benzene is added dropwise to a cooled solution of 106 g. α-chlorodiphenylacetyl chloride in 750 ml. benzene (containing a small amount of hexane), and the reaction mixture is refluxed for one hour, then cooled. To the cold reaction mixture is added (with stirring) 300 ml. water, then a solution of 30 ml. of concentrated hydrochloric acid in 100 ml. of water and finally about 400 ml. ethyl ether. The lower aqueous suspension is separated and the organic solvent layer is washed with 200 ml. water. The water washings are added to the aqueous suspension and after adding 400 ml. water, the mixture is then gradually heated to 90° C. The solution is cooled and to the crystalline N-(2-dimethylaminoethyl)-N-methylbenzilamide hydrochloride, which separates, is added a solution of 50 g. sodium hydroxide in 100 ml. water. The liberated base is then extracted with a mixture of ethyl ether and chloroform. After drying over magnesium sulfate, the solvent is allowed to evaporate and the colorless residual solid is purified by crystallization from hexane yielding about 98 g. N-(2-dimethylaminoethyl)-N-methyl benzilamide, M. P. 96–97° C.

(c) 2-(N-METHYLBENZILAMIDO) ETHYL TRIMETHYLAMMONIUM BROMIDE

A solution of 25.0 g. base obtained as described in part (b) in 100 ml. acetone is added to a solution of 15.2 g. methyl bromide in 37 ml. acetone. A heavy precipitate immediately separates. After allowing the reaction mixture to remain at room temperature overnight, the precipitate is separated by filtration and dried. After crystallization from 140 ml. absolute ethanol, the product is dried over phosphorous pentoxide to yield about 29.5 g. purified 2-(N-methyl benzilamido)ethyl trimethylammonium bromide, M. P. 201–202° C.

EXAMPLE 7

*2-(N-methyl benzilamido)ethyl dimethyl ethylammonium bromide*

To a solution of 20.5 g. base obtained as described in Example 6 (b) in 40 ml. acetone is added 21.8 g. ethyl bromide. A colorless crystalline product separates. After allowing the reaction mixture to remain at room temperature for several days, the product is separated by filtration, then crystallized from 250 ml. ethanol to yield about 26.0 g. purified 2-(N-methyl benzilamido)ethyl dimethyl ethylammonium bromide, M. P. 185–187° C.

EXAMPLE 8

*3-(N-methyl benzilamido)propyl trimethylammonium bromide*

(a) N,N-DIMETHYL-N'-FORMYL-1,3-PROPANEDIAMINE

To 200 g. cold formic acid (98–100%) is added, portionwise, 153 g. dimethylaminopropylamine. The resulting solution is refluxed for sixteen hours and the excess formic acid removed by distillation under reduced pressure. To the cooled residue is added a cold solution of 60 g. sodium hydroxide in 120 ml. water. The product is extracted with 75–25 ethyl ether-chloroform mixture and the combined extracts dried over magnesium sulfate. The solvent is evaporated and the residue distilled to yield about 52.4 g. N,N-dimethyl-N'-formyl-1,3-propanediamine as a colorless distillate, B. P. 118–119° C. (6 mm.).

(b) N,N,N'-TRIMETHYL-1,3-PROPANEDIAMINE

To a suspension of 25.0 g. lithium aluminum hydride in 900 ml. ether is added dropwise a solution of 50.4 g. amide obtained as described in part (a) in 50 ml. ethyl ether. [Cooling is necessary to control the exothermic reaction.] To the cooled mixture is added 40 ml. water, then a solution of 8 g. sodium hydroxide in 40 ml. water and finally 100 ml. of water. The resulting mixture is stirred for two hours, then filtered. The precipitate is washed with ethyl ether, and the washings are combined with the filtrate and dried over magnesium sulfate. After evaporation of the solvent, the residue is fractionated to yield about 29.0 g. N,N,N'-trimethyl-1,3-propanediamine as a colorless distillate, B. P. 140–142° C.

(c) N-(3-DIMETHYLAMINOPROPYL)-N-METHYLBENZILAMIDE

Interaction of 23.2 g. amine obtained as described in part (b) with a benzene-hexane solution of 58.3 g. α-chlorodiphenylacetyl chloride according to the procedure described in Example 1 (a) yields 58.2 g. of N-(3-dimethylaminopropyl)-N-methylbenzilamide as a pale yellow liquid.

(d) 3-(N-METHYLBENZILAMIDO)PROPYL TRIMETHYLAMMONIUM BROMIDE 20 g. base obtained as described in part (c), is dissolved in 100 ml. acetone. The solution is cooled, then added, portionwise, to a solution of 11.4 g. methyl bromide in 28 ml. acetone. A precipitate rapidly separates from the solution. After allowing the reaction mixture to remain at room temperature for twelve hours, the product is filtered and dried to yield about 25.8 g. 3-(N-methylbenzilamido)propyl trimethylammonium bromide, M. P. 238–239° C. Recrystallization of this material from ethanol does not alter the melting point.

EXAMPLE 9

*3 - (N - methylbenzilamido)propyl dimethyl ethylammonium bromide*

To a solution of 19.0 base, obtained as described in Example 8 (c), in 40 ml. acetone is added 21.8 g. ethyl bromide. A crystalline product slowly separates from solution. After allowing the reaction mixture to remain at room temperature for three days, the crystalline product is filtered, then recrystallized from 160 ml. of ethanol to yield about 22 g. 3-(N-methylbenzilamido)propyl dimethyl ethylammonium bromide, M. P. 210–212° C.

EXAMPLE 10

*3-(N-methylbenzilamido)propyl trimethylammonium bromide*

30.5 g. N,N-diethyl-N'-methyl-1,3-propanediamine in 50 ml. benzene is added dropwise to a cold solution of 66.2 g. α-chlorodiphenylacetyl chloride in 350 cl. benzene (containing a small amount of hexane). The product formed is isolated in the manner described in Example 1 (*a*) to yield about 67 g. N-(3-diethylaminopropyl)-N-methylbenzilamide as a pale yellow oil. 25 g. of this base is dissolved in 50 ml. acetone and a solution of 13.3 g. methyl bromide in 33 ml. acetone is added. After the reaction mixture has been allowed to remain at room temperature for one day, the 3-(N-methylbenzilamido)propyl trimethylammonium bromide is filtered off and dried. This material, on recrystallization from 110 ml. of ethanol, yields about 28.7 g. purified product, M. P. 192–193° C.

EXAMPLE 11

*N-(2-diethylaminoethyl) - N - methylbenzilamide hydrochloride*

A solution of 34.0 g. base, obtained as described in Example 1 (*a*), in 200 ml. ethyl ether is treated with a slight excess of ethereal hydrogen chloride. After recrystallization of the resulting precipitate from 40 ml. absolute alcohol, the N-(2-diethylaminoethyl)-N-methylbenzilamide hydrochloride is obtained as a colorless product, M. P. 157–158° C.

EXAMPLE 12

*N-(2-dimethylaminoethyl)-N-methylbenzilamide hydrochloride*

45.8 g. base described in Example 6 (*b*), is dissolved in 200 ml. warm absolute ethanol and 45 ml. 3.21 N alcoholic hydrogen chloride is added. The reaction mixture is cooled and the N-(2-dimethylaminoethyl)-N-methylbenzilamide hydrochloride rapidly crystallizes. Ethyl ether is added and acid-addition salt is filtered off. After recrystallization from 300 ml. of water, a colorless product is obtained weighing about 35.8 g. [M. P. 252–253° C. (dec.)].

EXAMPLE 13

*N-(3-dimethylaminopropyl)-N-methylbenzilamide hydrochloride*

A solution of 19.2 g. base obtained as described in Example 8(*c*) is dissolved in 75 ml. absolute ethanol and 18.3 ml. 3.21 N alcoholic hydrogen chloride is added. The product which slowly crystallizes from solution is separated by filtration. This material, on recrystallization from 100 ml. of absolute ethanol, yields about 17.5 g. purified N-(3-dimethylaminopropyl) - N - methylbenzilamide hydrochloride, M. P. 202–203° C. (dec.).

EXAMPLE 14

*N-(3-diethylaminopropyl) - N - methylbenzilamide hydrochloride*

A solution of 18.5 g. base obtained as described in Example 10 is dissolved in 50 ml. absolute ethanol and 16 ml. 3.21 N alcoholic hydrogen chloride is added. The resulting solution is diluted to about 500 ml. with ethyl ether. The oily product, which initially separates, gradually solidifies and is separated by filtration. After recrystallization from 60 ml. isopropyl alcohol, about 17.0 g. purified N-(3-diethylaminopropyl)-N-methylbenzilamide hydrochloride is obtained, M. P. 145–147° C.

EXAMPLE 15

*N-(morpholinoethyl)-N-methyl benzilamide and salts thereof*

Following the procedure of Example 1 (*a*) and (*b*), except that 260 g. morpholinoethyl methylamine is substituted for the 216 g. N,N-diethyl-N'-methyl-ethylenediamine of the reference example, N-(morpholinoethyl)-N-methyl benzilamide, its hydrochloride and methobromide are obtained.

EXAMPLE 16

*2-(N-methyl benzilamido)ethyl diethyl benzylammonium chloride*

Following the procedure of Example 1 (*b*) except that 1365 g. benzyl chloride is substituted for the 1019 g. methyl bromide of the reference example, 2-(N-methyl benzilamido)ethyl diethyl benzylammonium chloride is produced.

This invention may be variously otherwise embodied within the scope of the appended claims.

We claim:

1. Compounds of the group consisting of the free base, its HX acid-addition salts and its R″X quaternary salts, the free base having the formula

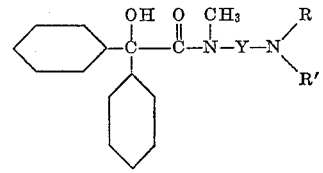

wherein Y is a lower alkylene of at least 2 carbon atoms,

is a member of the class consisting of

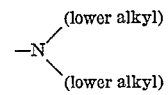

and N-morpholino, X is the anion of a pharmacologically-acceptable inorganic acid, and R″ is a member of the group consisting of lower alkyl and benzyl.

2. Compounds of the general formula

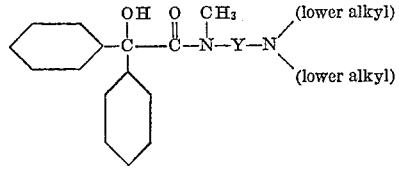

wherein Y is a lower alkylene of at least 2 carbon atoms.

3. Compounds of the general formula

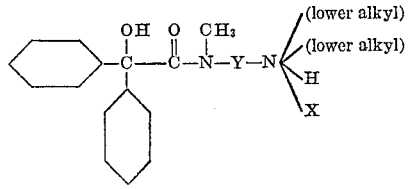

wherein Y is a lower alkylene of at least 2 carbon atoms, and X is the anion of a pharmacologically-acceptable inorganic acid.

4. Compounds of the general formula

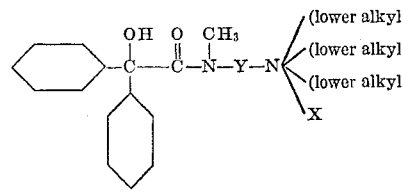

wherein Y is a lower alkylene of at least 2 carbon atoms, and X is the anion of a pharmacologically-acceptable inorganic acid.

5. Compounds of claim 4, wherein the inorganic acid is a halogen acid.

6. Compounds of the general formula

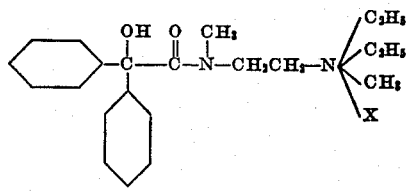

wherein X is the anion of a pharmacologically-acceptable inorganic acid.

7. 2-(N-mehtyl benzilamido) ethyl diethyl methyl-ammonium bromide.

8. 2-(N-methyl benzylamido) ethyl diethyl methyl-ammonium chloride.

9. 2-(N-mehtyl benzilamido) ethyl diethyl methyl-ammonium methosulfate.

References Cited in the file of this patent

UNITED STATES PATENTS

| | | |
|---|---|---|
| 2,009,144 | Miescher et al. | July 23, 1935 |

FOREIGN PATENTS

| | | |
|---|---|---|
| 438,659 | Great Britain | Nov. 15, 1935 |
| 662,066 | Germany | July 12, 1938 |